B. R. RICHARDSON.
DEVICE FOR EXTERMINATING BOLL WEEVILS.
APPLICATION FILED MAY 24, 1912.
1,050,847.
Patented Jan. 21, 1913.
2 SHEETS—SHEET 2.
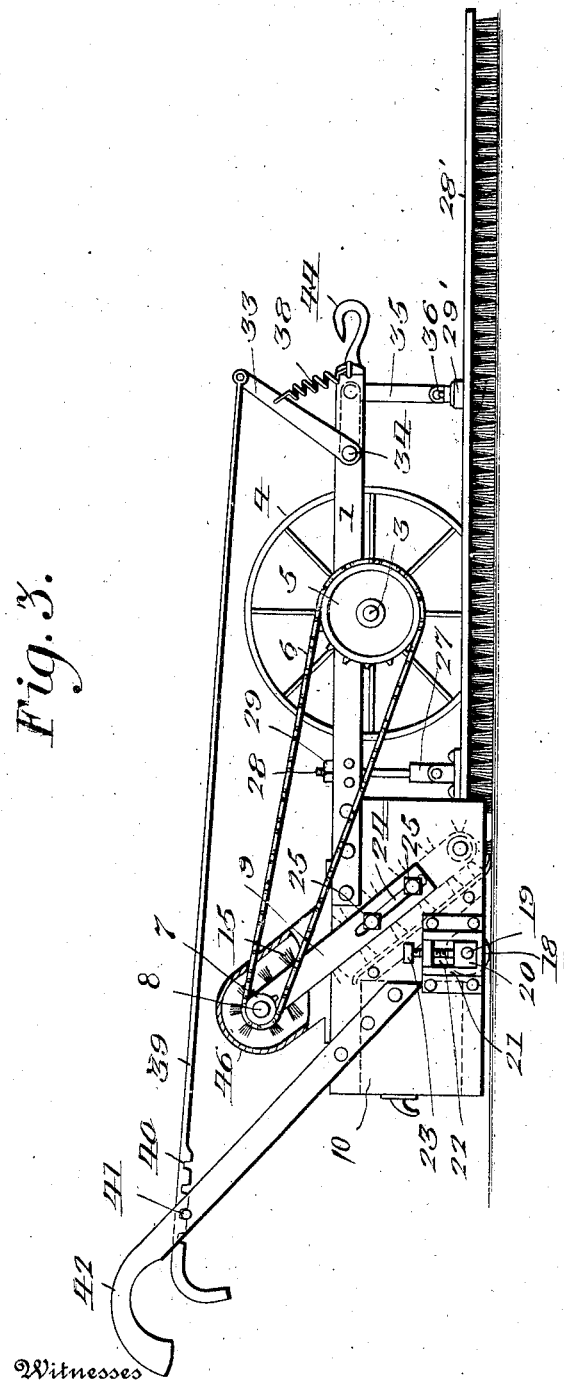
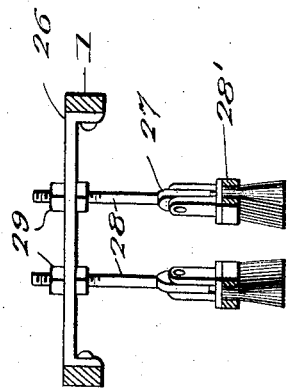
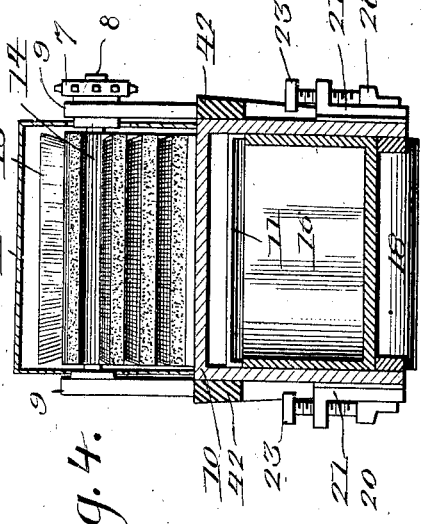
Inventor
B. R. Richardson
Witnesses
By Victor J. Evans
Attorney

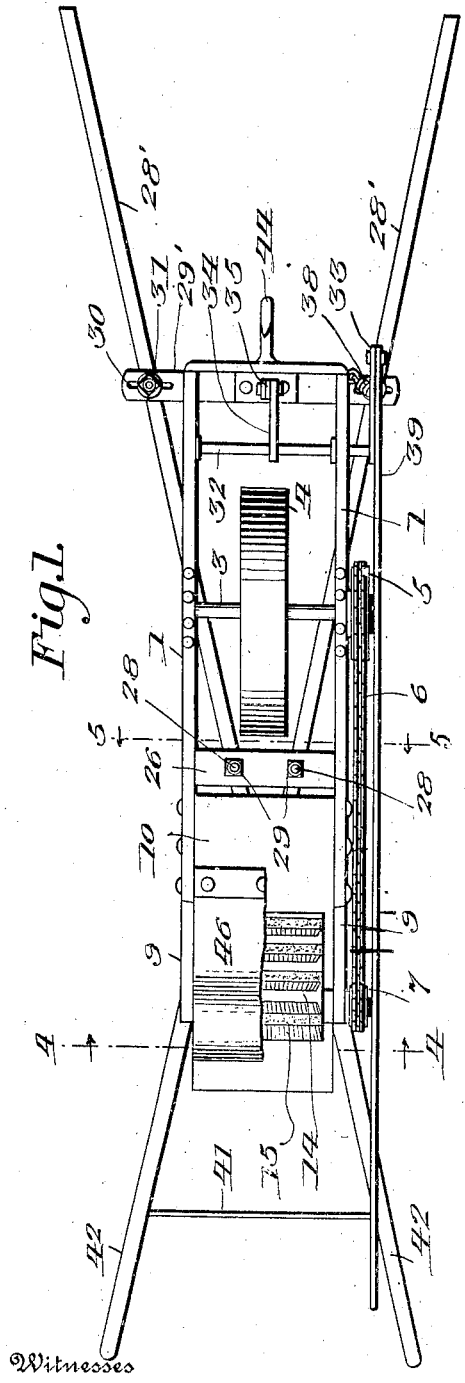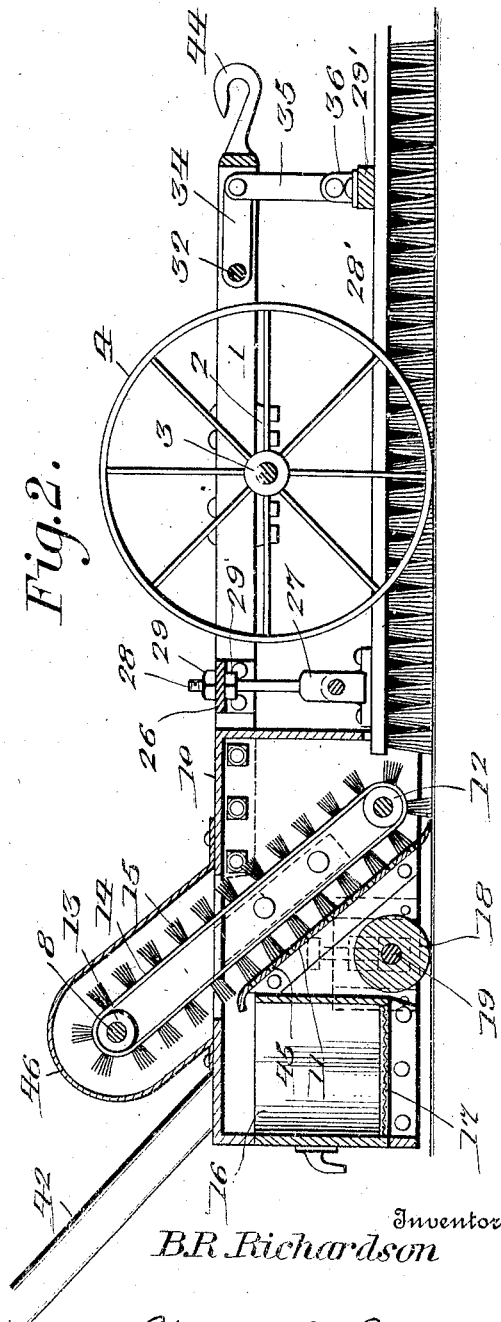

UNITED STATES PATENT OFFICE.

BENJAMIN R. RICHARDSON, OF DEATSVILLE, ALABAMA.

DEVICE FOR EXTERMINATING BOLL-WEEVILS.

1,050,847. Specification of Letters Patent. Patented Jan. 21, 1913.

Application filed May 24, 1912. Serial No. 699,527.

*To all whom it may concern:*

Be it known that I, BENJAMIN R. RICHARDSON, a citizen of the United States, residing at Deatsville, in the county of Elmore and State of Alabama, have invented new and useful Improvements in Devices for Exterminating Boll-Weevils, of which the following is a specification.

This invention relates to devices for exterminating boll weevils, and it has particular reference to that class of boll weevil exterminators which are utilized for gathering the fallen forms and squares which have been punctured by the weevil and wherein eggs have been deposited in order that such forms and squares may be subsequently destroyed.

The present invention has for its object to produce a gathering device of simple and improved construction whereby the forms and squares that have dropped on the ground will be gathered and conveyed into a box or receptacle from which they may be subsequently removed and destroyed.

Further objects of the invention are to simplify and improve the construction and operation of a device of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a device constructed in accordance with the invention. Fig. 2 is a longitudinal sectional view of the same. Fig. 3 is a side elevation. Fig. 4 is a transverse sectional view taken on the line 4—4 in Fig. 1. Fig. 5 is a transverse sectional view taken on the line 5—5 in Fig. 1.

Corresponding parts in the several figures are denoted by like characters of reference.

A frame which may be of rectangular or other convenient shape includes side members 1, 1 which are provided with boxes or bearings 2 wherein a shaft or axle 3 is supported for rotation, said axle carrying between the side members 1, 1 a ground engaging transporting wheel 4 which also constitutes the power wheel of the device. One end of the axle 3 carries a sprocket wheel 5 from which motion is transmitted by a chain or link belt 6 to a sprocket pinion 7 on a shaft 8 which is supported for rotation by means of arms or brackets 9 that are secured adjustably on the sides of a casing 10 which is carried by the rear portion of the frame. The front end of the casing 10 is open, and it has an upwardly and rearwardly inclined bottom member 11 adjacent to the lower end of which is supported a roller 12. A roller 13 which is mounted on the shaft 8 coöperates with the roller 12 to support an endless carrier which may be composed of an apron 14 of flexible, preferably textile, material, said apron being equipped at suitable intervals with transversely disposed brush members 15 which, when the machine is in operation and motion is transmitted from the axle 3 to the shaft 8 so as to drive the endless carrier, will sweep upwardly over the inclined bottom member 11, thus picking up fallen forms and squares from the ground and conveying the same upwardly over the bottom member 11 and discharging such gathered material over the rear edge of the bottom member 11 into a drawer or receptacle 16 which is slidably supported in the rear part of the casing. The bottom of the drawer 16 is preferably constructed of screen material, such as wire netting 17, to enable loose dirt to be separated from the forms and squares by sifting therethrough, the lower part of the casing being open so as to permit the loose dirt to drop directly on the ground. It is obvious that the contents of the drawer, when the latter has been filled, may be disposed of in any convenient manner.

The casing 10 is provided with a ground engaging roller 18 which is supported in the space between the inclined plane or bottom member 11 and the movably supported drawer or receptacle 16. The journals 19 of the roller 18 are mounted for rotation in bearing blocks 20 which are supported for vertical adjustment between guides 21 adjacent to a slot 22 in each side of the box, an adjusting screw 23 being provided whereby vertical adjustment of the roller bearings may be effected, thereby enabling the casing to be raised or lowered and supported in the most advantageous position for effective operation. The arms or brackets 9 that support the roller 13 are provided with slots 24 for the passage of fastening members such as screws or bolts 25, whereby they are mounted on the box or casing in such a manner as to be capable of being raised or lowered for the purpose of tightening the apron or conveyer member 14 which is guided over the roller 13.

The frame of the machine supports in rear of the power wheel 4 a cross bar 26 carrying a pair of standards 27 having screw threaded shanks 28 that extend through apertures in the cross bar 26 and are provided with adjusting and retaining nuts 29 whereby the standards may be raised and lowered. Hingedly connected with the lower ends of the standards are a pair of brush members 28' which extend and diverge forwardly adjacent to the two sides of the power wheel. Being hingedly connected with the standards 27 it is obvious that the brushes are capable of swinging up and down, and the threaded shank members which extend through the cross bar 26 will permit the standards 27 to move about the axes thereof, thus permitting the distance between the front ends of the brush members to be varied.

The rear ends of the brush members project within the front end of the casing 10, and the forward ends of the brush members diverge widely so as to extend beneath the branches of the rows of plants between which the machine is operated. The brushes will thus serve to collect all the fallen leaves, forms and squares that lie upon the ground and convey the same within the casing to a point where the material will be taken up by the endless carrier and conveyed thereby over the inclined bottom member 11 and into the drawer or receptacle 16. The brushes 28' are connected in advance of the power wheel by means of a cross bar 29' having slots 30 for the passage of fastening members such as bolts 31, associated with the brush members which latter may thus be moved toward or from each other as far as may be desired.

The side members 1 of the frame support near their front ends a rock shaft 32 having an upwardly extending arm 33 and a forwardly extending arm 34 which latter is connected by a link 35 with a lug 36 on the cross bar 29'. The arm 33 is connected with the front cross bar 39 of the frame by means of a spring 38 the tension of which is exerted to so operate the rock shaft as to move the forwardly extending arm 34 in a downward direction, thereby exerting downward pressure upon the cross bar 29' and upon the front ends of the brush members which are connected therewith. An operating rod 39 which is connected with the arm 33 extends rearwardly and is provided with notches 40 adapted to engage a rung 41 connecting the handles 42 which are secured upon and extend rearwardly from the sides of the casing 10 and which may be conveniently grasped by the operator who walks behind the machine and who by manipulating the rod 39 to place the notches 40 in engagement with the rung 41, may place the spring 38 under tension and so oscillate the rock shaft 32 as to elevate the front ends of the arm 34, thereby lifting the cross bar 29', and the front ends of the brushes connected therewith from the ground.

In the operation of this machine draft may be applied to the frame by means of a hook or clevis 44 at the front end of the frame. As the machine is drawn forwardly between the rows of plants it is supported partly on the power wheel 4 and partly on the ground engaging roller 18. Motion is transmitted from the axle of the machine by the chain or link belt 6 to the shaft 8 carrying the roller 13 over which the endless carrier having the brush members 15 is guided. The ground engaging brush members 28 which diverge forwardly will gather the fallen forms and squares and other rubbish which will be swept in the direction of the front end of the casing and within said casing where it is engaged by the brush members 15 of the endless carrier, being thereby carried over the inclined bottom member and discharged into the drawer 17. The bottom member 11 may be provided with apertures 45 to permit a portion of the loose dirt and dust to escape, the remainder of such dirt and dust being permitted to gravitate through the screen bottom 17 of the drawer 16. The contents of the latter may be emptied when desired and disposed of by burning or in any other suitable manner to destroy the eggs of the weevil.

That portion of the endless carrier 14 which extends above the casing 10 is preferably protected by a shield 46 whereby the carrier will be protected from the leaves and branches of the rows of plants between which the machine is operated.

Having thus described the invention, what is claimed as new, is:—

1. In a machine of the character described, a frame having a cross bar, standards having screw threaded shanks extending through the cross bar and connected therewith for vertical adjustment and for rotation about their axes, ground engaging brushes hingedly connected with the lower ends of the standards and diverging in a forward direction, a rock shaft carried by the frame and having an upwardly and a forwardly extending arm, a slotted cross bar with which the front ends of the brushes are adjustably connected, a link connecting said cross bar with the forwardly extending arm of the rock shaft, a spring actuating an arm of the rock shaft to oscillate the latter and to press the front ends of the brushes downwardly, and means for actuating the rock shaft against the tension of the spring and for supporting the brushes above ground engaging position.

2. In a device of the character described, a frame having an axle, a ground engaging power wheel in said axle, a casing carried by the frame and having a ground engaging roller and an upwardly and rearwardly inclined bottom member, an endless carrier having brush members engaging the bottom member, a drawer supported removably in the casing in rear of the bottom member and having a foraminous bottom, means for transmitting motion from the power wheel to the endless carrier, and a gathering device including ground engaging brushes extending and diverging forwardly from the casing, one at either side of the power wheel, means for supporting the rear ends of the ground engaging brushes for vertical adjustment, a cross piece with which the front ends of the brushes are connected for lateral adjustment, and means whereby said cross piece with the front ends of the brushes is supported for vertical adjustment including a spring whereby the front ends of the brushes are normally forced in a ground engaging direction.

In testimony whereof I affix my signature in presence of two witnesses.

BENJAMIN R. RICHARDSON.

Witnesses:
W. O. MASSENGALE,
W. J. SANFORD.